United States Patent [19]

Arioka et al.

[11] Patent Number: 4,950,535

[45] Date of Patent: * Aug. 21, 1990

[54] MAGNETIC RECORDING MEDIUM

[75] Inventors: Hiroyuki Arioka, Saku; Masharu Nishimatsu, Komoro; Toshiaki Ide, Saku, all of Japan

[73] Assignee: TDK Corporation, Chuo, Japan

[*] Notice: The portion of the term of this patent subsequent to Jan. 28, 2003 has been disclaimed.

[21] Appl. No.: 281,936

[22] Filed: Dec. 6, 1988

Related U.S. Application Data

[63] Continuation of Ser. No. 172,944, Mar. 22, 1988, abandoned, which is a continuation of Ser. No. 67,387, Jun. 24, 1987, abandoned, which is a continuation of Ser. No. 908,975, Sep. 17, 1986, abandoned, which is a continuation of Ser. No. 801,385, Nov. 22, 1985, abandoned, which is a continuation of Ser. No. 592,614, Mar. 23, 1984, abandoned.

[30] Foreign Application Priority Data

Mar. 25, 1983 [JP] Japan .................................. 58-48984

[51] Int. Cl.$^5$ ............................................. G11B 23/00
[52] U.S. Cl. ..................................... 428/536; 427/131; 427/132; 428/694; 428/695; 428/900
[58] Field of Search ............... 428/336, 694, 695, 900; 427/131, 132

[56] References Cited

U.S. PATENT DOCUMENTS

| | | | |
|---|---|---|---|
| 3,993,824 | 11/1976 | Shirahata | 428/900 |
| 4,452,863 | 6/1984 | Takizawa | 428/900 |
| 4,567,083 | 1/1986 | Arioka | 428/900 |

*Primary Examiner*—Paul J. Thibodeau
*Attorney, Agent, or Firm*—Wyatt, Gerber, Burke and Badie

[57] ABSTRACT

A magnetic recording medium, comprising a substrate, a ferromagnetic film layer formed on the surface of said substrate, and a back coating layer deposited on the other surface of said substrate and formed of a mixture produced by dispersing a powdered non-magnetic substance in a binder containing therein a thermosetting resin and at least one lubricant selected from the group consisting of fatty acids and fatty acid ester.

12 Claims, 1 Drawing Sheet

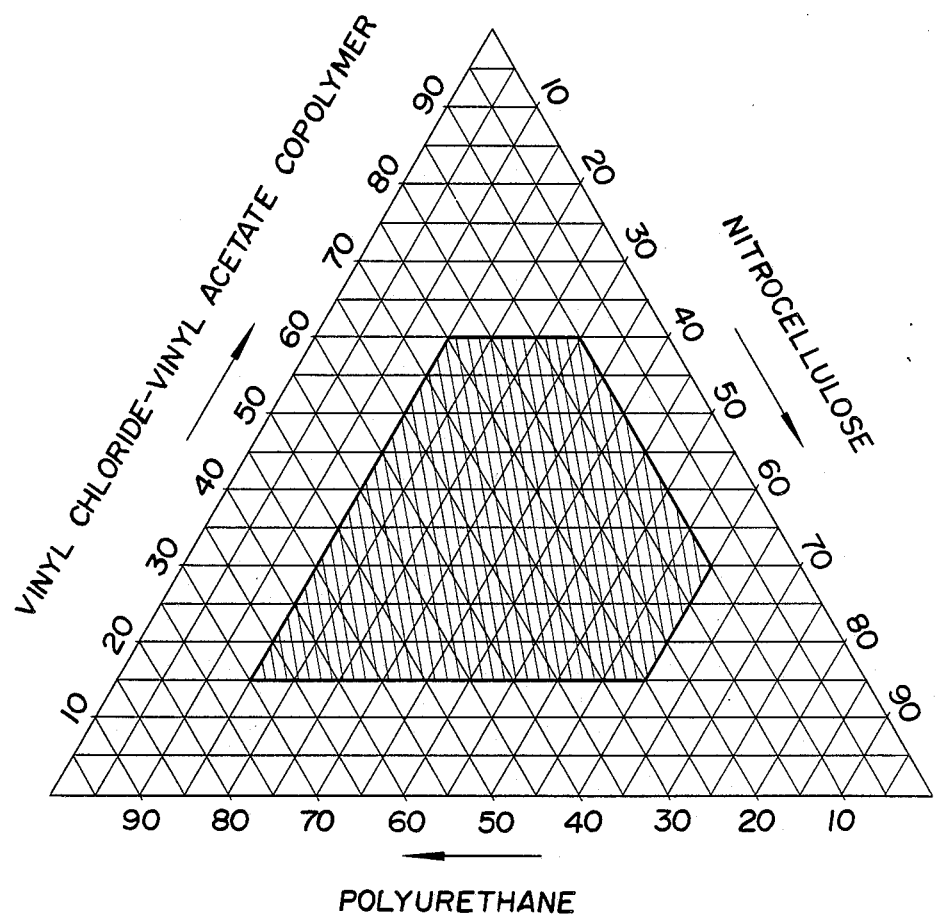

MAGNETIC RECORDING MEDIUM

RELATED APPLICATIONS

This application is a continuation application of application Ser. No. 07/172,944 filed Mar. 22, 1988 which is based on the following series of applications: 07/067,387 filed June 24, 1987 which is a continuation of 06/908,975 filed Sept. 17, 1986 which is a continuation of 06/801,385 filed Nov. 22, 1985 which is a continuation of 06/592,614 filed Mar. 23, 1984.

All of these applications are now abandoned.

BACKGROUND OF THE INVENTION

1. Field of the Invention:

This invention relates to a magnetic recording medium. More particularly, this invention relates to a magnetic recording medium which is produced by applying a back coating to a thin-film type magnetic recording medium having a ferromagnetic film formed on a substrate as by electroplating, chemical plating, vacuum deposition, spattering or ion plating and which, therefore, is enable to acquire a lower friction coeffieicnt, exhibit a less inclination to curl inwardly on the ferromagnetic film side, and show a smaller possibility of inducing the phenomenon of dropout than the original thin-film type magnetic recording medium.

2. Description of Prior Arts:

Magnetic recording media have to date found extensive utility in various applications such as to magnetic tapes for use in audio and video devices, magnetic disks for use in computers and word processors, and magnetic cards for use in other household devices. In consequence of expansion of these applications, the volume of information to be recorded on such magnetic recording media is growing year after year. In the circumstance, the desirability of developing magnetic recording media of higher recording density is winning growing recognition.

When a magnetic recording layer is formed by using the technique of electroplating, chemical plating, vacuum deposition, spattering or ion plating, for example, the produced ferromagnetic film is allowed to acquire high recording density because it consists wholly of metal, alloy or an oxide thereof. When the ferromagnetic film is formed by any of the methods described above, however, the surface condition of the substrate strongly affects the surface condition of the ferromagnetic film. To be specific, when the thin ferromagnetic film is deposited by such a method on the surface of a given stustrate, the surface condition of this particular substrate exerts an effect to bear strongly upon the surface condition of the ferromagnetic film.

For the purpose of minimizing the spacing loss between the magnetic recording medium and the magnetic head and curbing the phenomemon of dropout, the surface of the magnetic recording medium is desired to be smooth. Consequently, the substrate is desired to have a smooth surface. When the substrate gains in surface smoothness, however, the magnetic tape produced by using this substrate, while in travel in the recorder, tends to cling to guide rollers and support pins.

In view of this drawback, we have already proposed a magnetic recording medium which is provided with a back coating capable of manifesting highly effective rigidification enough to overcome the shortcomings suffered by the conventional magnetic recording media.

When this back coating is produced by preparing as a binder a mixture of thermoplastic resin represented by a vinyl chloride-vinyl acetate copolymer with polyurethane and an isocyanate compound or a mixture of the components just mentioned plus nitrocellulose, dipsersing a powdered non-magnetic substance in the aforementioned binder, and applying the resultant dispersion in the form of a layer, for example, there can be derived various effects such as (1) lowering the friction coefficient of the back side of the tape, (2) abating the inclination of the tape to curl inwardly on the ferromagnetic film side, (3) preventing the loss of cinching (the phenomenon of the wound tape to come loose on sudden stop of its rotation) and (4) precluding excessive clinging between the ferromagnetic film side and the back coating side of the tape.

Techniques such as this may well be concluded as basically contemplating a tape construction comprising a thin ferromagnetic film layer formed on one side of a substrate and a back coating on the other side of the substrate and using as the back coating what is obtained by dispersing a powdered non-magnetic substance in a binder containing a major proportion of thermosetting resin. The magnetic recording medium containing such a back coating as described above, as compared with the magnetic recording medium lacking the back coating, generates a further problem not associated with any of the aforementioned drawbacks. This problem is "jitter." By "jitter" is meant the phenomenon that a minute variation in phase results in vibrations of picture image. The jitter is believed to be ascribable to the smoothness of the travel of the tape in the recording device.

OBJECT OF THE INVENTION

An object of this invention, therefore, is to provide a novel magnetic recording medium.

Another object of this invention is to provide a thin ferromagnetic film type magnetic recording medium possessing a low coefficient of friction, exhibiting an inconspicuous curling property, and having a minimum dropout.

A further object of this invention is provide a magnetic recording medium of high recording density capable of effectively preventing the phenomenon of jitter without sacrificing any of the characteristics the back coating is expected to possess.

SUMMARY OF THE INVENTION

The various objects described above are accomplished by the invention providing a magnetic recording medium having formed on one side of a substrate a thin ferromagnetic film layer and on the other side of the substrate a back coating layer formed by dispersing a powdered non-magnetic substance in a binder comprising thermoplastic resin and at least one lubricant selected from the group consisting of fatty acids and fatty acid esters.

BRIEF DESCRIPTION OF THE DRAWING

The drawing is a ternary composition diagram showing the ranges in which the three coponents of the binder can be incorporated in the binder composition (in percentages by weight) usable for this invention.

PREFERRED EMBODIMENT OF THE INVENTION

In the magnetic recording medium of this invention, the substrate itself and the thin ferromagnetic film layer formed on the front side of the substrate do not constitute parts characteristic of the present invention. Typical examples of the substrate which are normaly employed are films or sheets of polyethylene terephthalate, polybutylene terephthalate, polyamides and polyimides. Thin polyethylene terephthalate films which have undergone the treatment for monoaxial or biaxial orientation are very popular. The substrate is in the form of a tape, a disk or a card, for example. It is desired to be in the form of a tape of a thickness in the range of 0.01 to 6 $\mu$m, preferably 0.01 to 4 $\mu$m.

The ferromagnetic film layer is a film of a metal, an alloy or an oxide thereof formed as by electroplating, chemical plating, vacuum deposition, spattering or ion plating. Examples of the metal or alloy to be used for the formation of the ferromagnetic film include iron, cobalt, nickel and other ferromagnetic metals, and ferromagnetic alloys such as Fe—Co, Fe—Ni, Co—Ni, Fe—Si, Fe—Rb, Co—P, Co—B, Co—Si, Co—V, Co—Y, Co—La, Co—Ce, Co—Pr, Co—Sm, Co—Pt, Co—Mn, Fe—Co—Ni, Co—Ni—P, Co—Ni—B, Co—Ni—Ag, Co—Ni—Na, Co—Ni—Ce, Co—Ni—Zn, Co—Ni—Cu, Co—Ni—W, Co—Ni—Re and Co—Sm—Cu, and oxides of such metals and alloys. The thickness of the ferromagnetic film is in the range of 0.01 to 1 $\mu$m, preferably 0.01 to 0.3 $\mu$m.

The back coating layer is formed by dispersing a powdered non-magnetic substance in a binder containing a thermosetting resin and at least one lubricant selected form the group consisting of fatty acids and fatty acid esters thereby producing a back coating composition, applying the back coating composition to the surface of the substrate on the side opposite from the side supporting the ferromagnetic film layer, and thereafter thermally setting the applied layer. The thickness of the back coating in its dry state is in the range of 0.01 to 3 $\mu$m, preferably 0.1 to 2 $\mu$m.

The powdered non-magnetic substance is one or more substance selected from the group consisting of the compounds known as pigments and fillers in the art. This powder is added to the back coating composition for the purpose of adjusting the ruggedness of the surface of the produced back coating and enhancing the reinforced rigidification of the back coating layer. The ruggedness of the surface of the back coating significantly affects the aforementioned phenomenon of cinching. Provision of proper ruggedness for the surface improves the phenomenon of cinching. Further, the ruggedness of the back coating affects the travelling property of the tape, the clinginess between the ferromagnetic layer and the back coating layer, and the like. Excessive addition to the ruggedness of the back coating layer tends to induce variation in the output. Thus, it is important that the proper ruggedness of the surface of the back coating layer should be selected by appropriately combining specific materials so as to alleviate the phenomenon of cinching and yet curb possible induction of variation in the output. The grain size, the content, and the condition of dispersion of the powdered non-magnetic substance govern the ruggedness of the back coating layer. As described above, the powdered non-magnetic substance plays an important role in enhancing the rigidity of the back coating layer and lessening the abrasion of the back coating layer. For the purpose of heightening the reinforcing effect, a rigid powder such as of abradant may be used as part of the powdered non-magnetic substance. Further for the purpose of imparting an antistatic effect in the back coating layer, the powdered non-magnetic may incorporate an electroconductive powder.

Examples of the powdered non-magnetic substance usable advantageously herein include (1) electroconductive substances such as carbon black and graphite and (2) inorganic fillers such as $SiO_2$, $TiO_2$, $Al_2O_3$, $Cr_2O_3$, SiC, $CeO_2$, $CaCO_3$, zinc oxide, goethite, $\alpha$-$Fe_2O_3$, talc, kaolin, $CaSO_4$, boron nitride, graphite fluoride and molybdenum disulfide. The average particle diameter of the powder is in the range of 0.01 to 1 $\mu$m, preferably 0.01 to 0.1 $\mu$m. The electroconductive substances of (1) and the inorganic fillers of (2) mentioned above may be used either singly or in the form of a desired combination. The amount of the powder advantageously used is in the range of 20 to 100 parts in the case of the electroconductive substance of (1) or in the range of 10 to 300 parts in the case of the inorganic filler of (2) respectively based on 100 parts of the binder to be used. When the amount of the powder thus incorporated is too large, there is the disadvantage that the produced back coating layer will be brittle and the dropout will increase. Typically, $CaCO_3$ and carbon are used particularly advantageously.

The binder for the back coating composition is made of thermosetting resin composition. This thermosetting resin is formed of a thermoplastic polymer, polyurethane and an isocyanate compound. By combining the thermosetting resin composition with at least one lubricant selected from the group consisting of fatty acids and fatty acid esters and dispersing the aforementioned powdered non-magnetic substance in the resultant mixture, the produced magnetic tape will manifest improvements with respect to the phenomenon of cinching, the abrasion of the back layer, and the clinginess between the ferromagnetic film layer and the back coating layer. Further incorporation of nitrocellulose in the aforementioned binder results in substantial prevention of the otherwise possible decline of the video S/N ratio. The isocyanate compound causes crosslinking of the thermoplatic polymer component in the thermosetting resin composition and contributes to protect of the back coating layer from abrasion. The polyurethane combines itself with the thermoplastic resin and the isocyanate compound and creates a surface incapable of clinging to the ferromagnetic film layer. The nitrocellulose facilitates dispersion of the powdered non-magnetic substance in the binder and prevents otherwise possible decline of the video, S/N ratio.

One of the desirable thermoplastic components of the thermosetting resin composition, is a vinyl chloride type copolymer, for example. Typical examples of the vinyl chloride type copolymer include vinyl chloride-vinyl acetate copolymer, vinyl chloride-vinyl alcohol copolymer, vinyl chloride-vinyl alcohol-vinyl propionate copolymer, vinyl chloride-vinyl acetate-maleic acid copolymer (including a partially saponified copolymer) and vinyl chloride-vinyl acetate terminal OH side chain alkyl copolymer. The vinyl chloride-vinyl acetate (of a molar ratio of 97:3 to 20:80) copolymer is particularly advantageously among other vinyl chloride type copolymers mentioned above. The vinyl chloride type copolymer employed herein will normally have a polymerization degree in the range of 80 to 5, preferably 60 to 5.

The polyurethane for used as the binder may be in the form of a prepolymer adhesive agent or an isocyanate-modified polymer, for example. The prepolymer adhesive agent is obtained by the reaction of the diisocyanate with a polyfunctional active hydrogen containing compound which results in the production of a prepolymer having a terminal NCO group. Examples of the diisocyanate compounds advantageously usable herein include 2,4-tolylene diisocyanate, a 2,4- and 2,6-tolylene diisocyanate mixture, 4,4'-diphenylmethane diisocyanate and hexamethylene diisocyanate. Typical examples of the polyfunctional activated hydrogen compound are polyesters, polyethers and polyester-ethers. The isocyanate-modified polymer is obtained by polymerizing an a molar excess of polyester or polyether containing at least two reactive hydroxyl groups with a diisocyanate such as tolylene diisocyanate of 4,4'-diphenylmethane diisocyanate thereby giveing rise to a polymer having terminal hydroxyl groups. Depending on the size of the molecular weight, the produced isocyanate-modified polymer is used either as it is produced or after further incorporating therein a small amount of Coronate L or a prepolymer of a terminal NCO group as a curing agent. Concrete examples of the polyurethane usable in the binder of this invention include Desmocoll 12, Desmocoll 22, Desmocoll 176 and Desmocoll 400 (products of Bayer AG) and Nippolan 3022 (product of Nippon Polyurethane Co., Ltd.).

Typical examples of the isocyanate compound similarly usable include triphenylmethane triisocyanate (Desmodur R), tris-phenyl-(4-phenylisocyanate) thiophosphate (Desmodur RF), Desmodur L, TDI dimer (Desmodur TT), the polymer of TDI tremer (such as Desmodur IL) (products of Bayer AG), 2,4,4'-diphenylether triisocyanate (Hylen DM), 4,4'-diphenylmethane diisocyanate (MDI), and an isocyanate compound capable of regenerating a NCO group on heating such as Coronate Ap.

The proportions of the components which make up the binder may be varied over a wide range. When a mixture of a vinyl chloride type copolymer such as, for example, vinyl chloride-vinyl acetate copolymer, with polyurethane and an isocyanate compound is used as the binder, the mixing ratio of the vinyl chloride type copolymer and the polyurethane is generally fixed so that the former will account for 10 to 80% by weight, preferably, 10 to 60% by weight and the latter for the balance to make up 100% by weight. Although the isocyanate ompound manifests the expected effect of its addition even when the amount of its addition is small, it is generally added in the amount of 5 to 80 parts by weight, preferably 5 to 60 parts by weight, based on 100 parts by weight of the total of the aforementioned vinyl chloride type copolymer such as vinyl chloride-vinyl acetate copolymer, and the polyurethane.

When the mixture containing of nitrocellulose, a vinyl chloride type copolymer [such as, for example, vinyl chloride-vinyl acetate copolymer, vinyl chloride-vinyl alcohol copolymer, vinyl chloride-vinyl alcohol-vinyl propionate copolymer, vinyl chloride-vinyl acetate-maleic acid copolymer (including partially saponified copolymer), vinyl chloride-vinyl acetate-terminal OH side chain alkyl group copolymer], polyurethane, and an isocyanate compound is used as the binder, the mixing ratio of the nitrocellulose, the vinyl chloride-vinyl acetate copolymer, and the polyurethane is generally selected in the range indicated by the slanted lines in the accompanying diagram, specifically the nitrocellulose in the range of 15 to 60% by weight, preferably 15 to 50% by weight, the vinyl chloride type copolymer such as, for example, vinyl chloride-vinyl cetate copolymer in the range of 15 to 50% by weight, preferably 15 to 40% by weight, and the polyurethane in the range of 10 to 70% by weight, preferably 10 to 60% by weight respectively. Although the isocyanate compound, as already described above, manifests the expected effect of its addition even when it is used in a very small amount, it is generally added in the amount of 5 to 80 parts by weight, preferably 5 to 60 parts by weight, based on 100 parts by weight of the total of the vinyl chloride type copolymer such as, for example, vinyl chloride-vinyl acetate copolymer and the polyurethane.

The fatty acid and/or fatty acid ester to be used as the lubricant serves to smoothen the travel of the magnetic tape and provide effective prevention of jitter. Desirable fatty acids are those fatty acids having 10 to 22 carbon atoms, preferably 10 to 18 carbon atoms. Saturated aliphatic monocarboxylic acids are particularly useful. Specifically, they are capric acid, lauric acid, myristic acid, palmitic acid, stearic acid, arachic acid, and behenic acid, for example. Desirable fatty acid esters are alkyl esters, having 1 to 26 carbon atoms preferably 4 to 18 carbon atoms, of the aforementioned fatty acids. Specifically, they are ethyl laurate, isopropyl laurate, butyl laurate, ethyl myristate, propyl myristate, methyl stearate, ethyl stearate, isopropyl stearate and butyl stearate, for example. These fatty acids and fatty acid esters may be used either singly or in the form of suitable mixutres. The lubricant manifests the expected effect of lubrication even when it is used in an extremely small amount. Generally, the lubricant is added in the amount of 0.1 to 30% by weight, preferably 0.1 to 20% by weight, based on the total amount of the binder. Optionally, it may be added in a greater amount. Namely, the amount of the lubricant to be added is suitably determined depending on the particular back coating layer to be actually used.

After the aforementioned back coating composition has been applied to the surface of the substrate opposite from the side supporting the ferromagnetic film layer, it is subjected to a thermal treatment at temperatures of 40° to 90 ° C., preferably 60° to 80° C., for a period of 5 to 100 hours, preferably 10 to 48 hours to form the back coating layer.

The following non-limiting examples are given by by way of illustration only. The properties referred to therein were determined or evaluated as follows.

(1) Coefficient of friction

On an aluminum cylinder having a polished surface 4 mm in diameter, a given magnetic tape was wound one complete cycle with the back coating side thereof on the inside and the opposite ends thereof drawn in directions embracing an angle of 180°. The tape was run at a speed of 2 cm/sec. and the tension of the tape on the unwinding side and the tension thereof on the rewinding side were measured. The coefficient of friction was calculated based on the two values of tension thus measured.

(2) Phenomenon of cinching

With a VHS type VTR available generally in the market, a given magnetic tape was completely unwound by rapid feeding and then rewound by rapid returning and, in the course of the return travel, stopped when the remaining length of the tape decreased to 50 m and started again by rapid returning and brought to completion of the rewinding. Then, the rewound tape was visually inspected to rate the condition in which the tape is wound on the spool. The good condition of tape winding testified by absolute absence of gap between the adjacent plies of tape was reported the mark O and the condition showing a gap between the adjacent plies of tape was reported by the mark x.

(3) Abrasion of back coating layer

With a VHS type VTR available generally in the market, a given magnetic tape was reciprocated 100 cycles under the conditions of 40° C. of temperature and 80% of relative humidity. Then the interior of the cassette case was visually tested for degree of defilement. The occurence of defilement was reported by the mark x and the absence of the defilement by the mark O.

(4) Clinginess between the ferromagnetic film layer and the back coating layer

The magnetic tape was wound on a VHS reel and left standing at 60° C. for five days. After the standing, the tape was visually inspected to rate the condition of clinginess between the two layers mentioned. The absence of clinginess was reported by the mark O and the presence of clinginess by the mark x.

(5) Jitter

With a VHS type VTR, a given magnetic tape was run 100 times under the conditions of 40° C. of temperature and 80% of relative humidity. During the travel of the tape, the picture images produced on the screen were visually inspected for possible vibration. The absence of vibrations in the images was reported by the mark O and the presence of vibrations by the mark x.

(6) Curl

A square, 50 mm×50 mm, cut from a magnetic tape was placed on a flat, smooth glass plate and visually inspected. The absence of curl in the square of tape was reported by the mark O and the presence of curl by the mark x.

(7) Surface coarseness

This physical property was rated by the 20-point average method based on the chart obtained by the Talystep (produced by Talor-Hobson Corp.). Controls 1 to 4 and Examples 1 to 4.

While electroplating, chemical plating, vacuum deposition, spattering and ion plating are available for the formation of magnetic recording media incorporating ferromagnetic films, the working examples and relevant controls cited herein adopted the method of vacuum deposition. A cobalt-nickel (8/2) alloy ingot and a polyethylene terephthalate film (0.1 μm in thickness) as a substrate were prepared. On the substrate held obliquely, the vapor of the alloy from the ingot was vacuum deposited (under a vacuum of Torrs). By regulating the amount of heat applied to the alloy ingot and the speed of feeding of the substrate, the alloy was deposited in a thickness of about 1500 Å. Thus, a master roll having an alloy layer deposited thereon was obtained.

Then, a varying set of components for back coating composition indicated in Table 1 were thoroughly dispersed with a ball mill. The resultant mixture was applied to the surface of the aforementioned master roll on the side opposite from the side suppoting the aforementioned ferromagnetic layer and heated at a fixed temperature of 80° C. for 48 hours to form a back coating layer 1 m in thickness. The roll thus finished was cut to prescribed lengths to produce VHS video cassette tapes. These tapes were evaluated for the various properties by the methods described above. The results were as shown in Table 2.

It is noted from Table 2 that when the back coating layers contained a lubricant, the phenomenon of jitter observed in the tapes of Controls 2–4 was eliminated and the coefficients of friction were lowered. Table 2 further indicates that when a powdered non-magnetic substance was dispersed in binders containing a vinyl chloride-vinyl acetate copolymer, nitrocellulose, polyurethane, and an isocyanate compound, there were produced back coating layers which excelled in terms of the phenomenon of cinching, the abrasion of back coating layer, and the clinginess between the back coating layer and the ferromagnetic layer. The present inveniton eliminates the various problems encountered by the ferromagnetic film media and makes significant contribution to the commercialization of these film media.

TABLE 1

| Specimen of | Composition of back coating (% by weight) | | | | |
|---|---|---|---|---|---|
| | Powdered non-magnetic substance, CaCO$_3$ | Nitrocellulose | Vinyl chloride-vinyl acetate copolymer | Polyurethane | Irocyanate compound | Lubricant |
| Control 1 | No back coating | | | | | |
| Control 2 | 67 | 0 | 16.5 | 16.5 | 0 | 0 |
| Control 3 | 34 | 14 | 14 | 28 | 10 | 0 |
| Control 4 | 67 | 9 | 5 | 14 | 5 | 0 |
| Example 1 | 67 | 7 | 7 | 12 | 5 | 2 |
| Example 2 | 34 | 14 | 14 | 24 | 10 | 4 |
| Example 3 | 67 | 9 | 5 | 12 | 5 | 2 |

Note:
The following commercially available products were used as the components indicated above in the table.
CaCO$_3$: Product (average particle diameter 0.04 μm) by Shiraishi Calcium Co., Ltd.
Nitrocellulose: Nitrocellulose produced by Daicell Co., Ltd.
Vinyl chloride-vinyl acetate copolymer: Product of UCC, marketed under trademark designation of VAGH.
Polyurethane: Product of Bayer AG, marketed under trademark designation of Desmocoll 22.
Isocyanate comound: Product of Bayer AG, marketed under trademark designation of Desmodur L.
Lubricant for Example 1: Lauric acid
Lubricant for Example 2: A 1:1 mixture of stearic acid and butyl myristate.
Lubricant for Example 3: Butyl stearate

TABLE 2

| Specimen | Coefficient of friction | Cinching | Abrasion of back coating | Clinginess with ferromagnetic layer | Jitter | Curl | Surface coarseness Rp-p (μm) |
|---|---|---|---|---|---|---|---|
| Control 1 | 0.62 | x | o | o | o | x | 0.08 |
| Control 2 | 0.38 | o | x | o | x | o | 0.31 |
| Control 3 | 0.40 | o | o | o | x | o | 0.32 |
| Control 4 | 0.41 | o | o | o | x | o | 0.29 |
| Example 1 | 0.28 | o | o | o | o | o | 0.30 |
| Example 2 | 0.30 | o | o | o | o | o | 0.31 |
| Example 3 | 0.29 | o | o | o | o | o | 0.33 |

What is claimed is:

1. A magnetic recording medium comprising
   a substrate,
   a ferromagnetic metal film layer on one surface of said substrate having a thickness of 0.1 to 1 μm, and
   a back coating layer formed on the other surface of said substrate from a composition comprising (a) a thermosetting resin binder comprising a vinyl chloride type copolymer, polyurethane, and an isocyanate compound, (b) a powder nonmagnetic substance dispersed in the binder, and (c) at least one lubricant selected from the group consisting of fatty acids and fatty acid esters, the back coating layer having a thickness of 0.1 to 3 μm to reduce curling.

2. A magnetic recording medium according to claim 1, wherein said fatty acids are aliphatic monocarboxylic acids of 10 to 22 carbon atoms and said fatty acid esters are alkyl esters, having 1 to 26 carbon atoms, of said fatty acids.

3. A magnetic recording medium according to claim 1, wherein said fatty acids are aliphatic monocarboxylic acids of 10 to 18 carbon atoms and said fatty acid esters are alkyl esters, having 4 to 18 carbon atoms, of said fatty acids.

4. A magnetic recording medium according to claim 1, wherein said vinyl chloride type copolymer is vinyl chloride-vinyl acetate copolymer.

5. A magnetic recording medium according to claim 1 wherein said binder further comprises nitrocellulose.

6. A magnetic recording medium according to claim 2, wherein said lubricant is incorporated in the amount of 0.1 to 30% by weight based on the total amount of said binder, said lubricant and said powdered non-magnetic substance.

7. A magnetic recording medium according to claim 1, wherein the gravimetric ratio of the vinyl chloride type copolymer to the polyurethane falls in the range of 10-80:90-20.

8. A magnetic recording medium according to claim 7, wherein said isocyanate compound is incorporated in the amount of 5 to 80 parts by weight based on 100 parts by weight of the total amount of said vinyl chloride type copolymer and said polyurethane.

9. A magnetic recording medium according to claim 5, wherein the gravimetric ratio of said nitrocellulose, said vinyl chloride type copolymer and said polyurethane falls in the range of 15-60:15-60:10-70.

10. A magnetic recording medium according to claim 9, wherein said isocyanate compound is incorporated in the amount of 5 to 80 parts by weight based on 100 parts by weight of the total amount of said vinyl chloride type copolymer and said polyurethane.

11. A magnetic recording medium according to claim 1, wherein said substrate is polyethylene terephthalate film.

12. A magnetic recording medium according to claim 1 wherein the ferromagnetic metal film layer is formed of a cobalt base alloy.

* * * * *

UNITED STATES PATENT OFFICE
CERTIFICATE OF CORRECTION

Patent No. 4,950,535                    Dated August 21, 1990

Inventor(s) Hiroyuki Arioka, Masharu Nishimatsu, Toshiaki Ide

It is certified that error appears in the above-identified patent and that said Letters Patent is hereby corrected as shown below:

Claim 1, line 4

Change: "0.1" to read
--0.01--

Signed and Sealed this

Third Day of March, 1992

Attest:

HARRY F. MANBECK, JR.

*Attesting Officer*            *Commissioner of Patents and Trademarks*